United States Patent
Occchipinti et al.

(10) Patent No.: US 10,069,779 B2
(45) Date of Patent: Sep. 4, 2018

(54) METHOD OF HYBRID MESSAGE PASSING WITH SHARED MEMORY

(71) Applicant: GE AVIATION SYSTEMS LLC, Grand Rapids, MI (US)

(72) Inventors: Benjamin Thomas Occhipinti, Grand Rapids, MI (US); Konrad Robert Kuczynski, Grand Rapids, MI (US); Eric Daniel Buehler, Grand Rapids, MI (US)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 295 days.

(21) Appl. No.: 13/849,716

(22) Filed: Mar. 25, 2013

(65) Prior Publication Data

US 2014/0289341 A1    Sep. 25, 2014

(51) Int. Cl.
*G06F 13/00* (2006.01)
*H04L 12/58* (2006.01)

(52) U.S. Cl.
CPC ............ *H04L 51/18* (2013.01); *H04L 51/046* (2013.01); *H04L 51/08* (2013.01)

(58) Field of Classification Search
CPC .... G06Q 10/107; G06Q 10/10; G06F 9/4856; H04L 51/18; H04L 51/08; H04L 51/046; H04L 12/584; H04L 51/04; H04L 12/58
USPC .......... 709/204–206, 245, 224; 715/751–759
See application file for complete search history.

(56) References Cited

U.S. PATENT DOCUMENTS

| | | | |
|---|---|---|---|
| 6,148,329 A * | 11/2000 | Meyer | 709/206 |
| 6,601,089 B1 * | 7/2003 | Sistare et al. | 709/213 |
| 7,506,032 B1 | 3/2009 | Ramarao et al. | |
| 7,532,890 B2 * | 5/2009 | Davies et al. | 455/449 |
| 8,428,604 B2 * | 4/2013 | Davies et al. | 455/449 |
| 8,429,141 B2 * | 4/2013 | Brun et al. | 707/694 |
| 8,676,155 B2 * | 3/2014 | Fan et al. | 455/406 |

(Continued)

FOREIGN PATENT DOCUMENTS

| | | |
|---|---|---|
| CN | 1908891 A | 2/2007 |
| EP | 2645248 A1 | 10/2013 |

(Continued)

OTHER PUBLICATIONS

GB Combined Search and Exam Report issued in connection with corresponding Application No. GB1401083.9 dated Jun. 25, 2014.

(Continued)

*Primary Examiner* — Kenneth R Coulter
(74) *Attorney, Agent, or Firm* — GE Aviation Systems LLC; William Andes

(57) ABSTRACT

A method of communicating data between at least two coprocessors in a single computing environment wherein one of the coprocessors is a transmitting processor and the other of the coprocessors is a receiving processor and the single computing environment includes a memory accessible by the coprocessors includes, among other things, determining in the transmitting processor the size of data to be communicated, attaching the data to a message and transmitting the message to the receiving processor if the size of the data is below or equal to a predetermined threshold value, and transmitting to the receiving processor a pointer that points to a location of the data in the memory if the size of the data is above the predetermined threshold value.

13 Claims, 1 Drawing Sheet

(56) References Cited

U.S. PATENT DOCUMENTS

| | | | |
|---|---|---|---|
| 2005/0246186 A1* | 11/2005 | Nikolov | 705/1 |
| 2006/0168055 A1* | 7/2006 | Wixted et al. | 709/206 |
| 2006/0224750 A1* | 10/2006 | Davies et al. | 709/229 |
| 2006/0248156 A1* | 11/2006 | Judge et al. | 709/206 |
| 2007/0033303 A1 | 2/2007 | Bridges et al. | |
| 2009/0265763 A1* | 10/2009 | Davies et al. | 726/3 |
| 2012/0226707 A1* | 9/2012 | Brun et al. | 707/769 |
| 2013/0210470 A1* | 8/2013 | Davies et al. | 455/466 |
| 2015/0081812 A1* | 3/2015 | Davies et al. | 709/206 |

FOREIGN PATENT DOCUMENTS

| | | |
|---|---|---|
| JP | 06139201 A | 5/1994 |
| JP | H09-198361 A | 7/1997 |
| JP | 2010-061648 A | 3/2010 |
| JP | 2011-170476 A | 9/2011 |

OTHER PUBLICATIONS

Martin J. Chorley, David W. Walker, and Martyn F. Guest, Hybrid Message-Passing and Shared-Memory Programming in a Molecular Dynamics Application on Multicore Clusters, The International Journal of High Performance Computing Applications, vol. 23, No. 3, Fall 2009, pp. 196-211, DOI: 10.1177/1094342009106188, United Kingdom.

John David Kubiatowicz, Integrated Shared-Memory and Message-Passing Communication in the Alewife Multiprocessor, 250 pages, Doctor of Philosophy thesis at the Massachusetts Institute of Technology, copyright Feb. 1998, USA.

Sergio V. Tota, Mario R. Casu, Massimo Ruo Roch, Luca Rostagno, and Maurizio Zamboni, MEDEA: a Hybrid Shared-memory/Message-passing Multiprocessor NoC-based Architecture, 6 pages, Mar. 2010 EDAA conference, ISBN 978-3-9810801-6-2, Italy.

Unofficial English Translation of Chinese Office Action issued in connection with corresponding CN Application No. 201410129531.0 dated Jun. 28, 2017.

Machine Translation and Notification of Reasons for Refusal issued in connection with corresponding JP Application No. 2014-009069 dated Mar. 6, 2018.

* cited by examiner

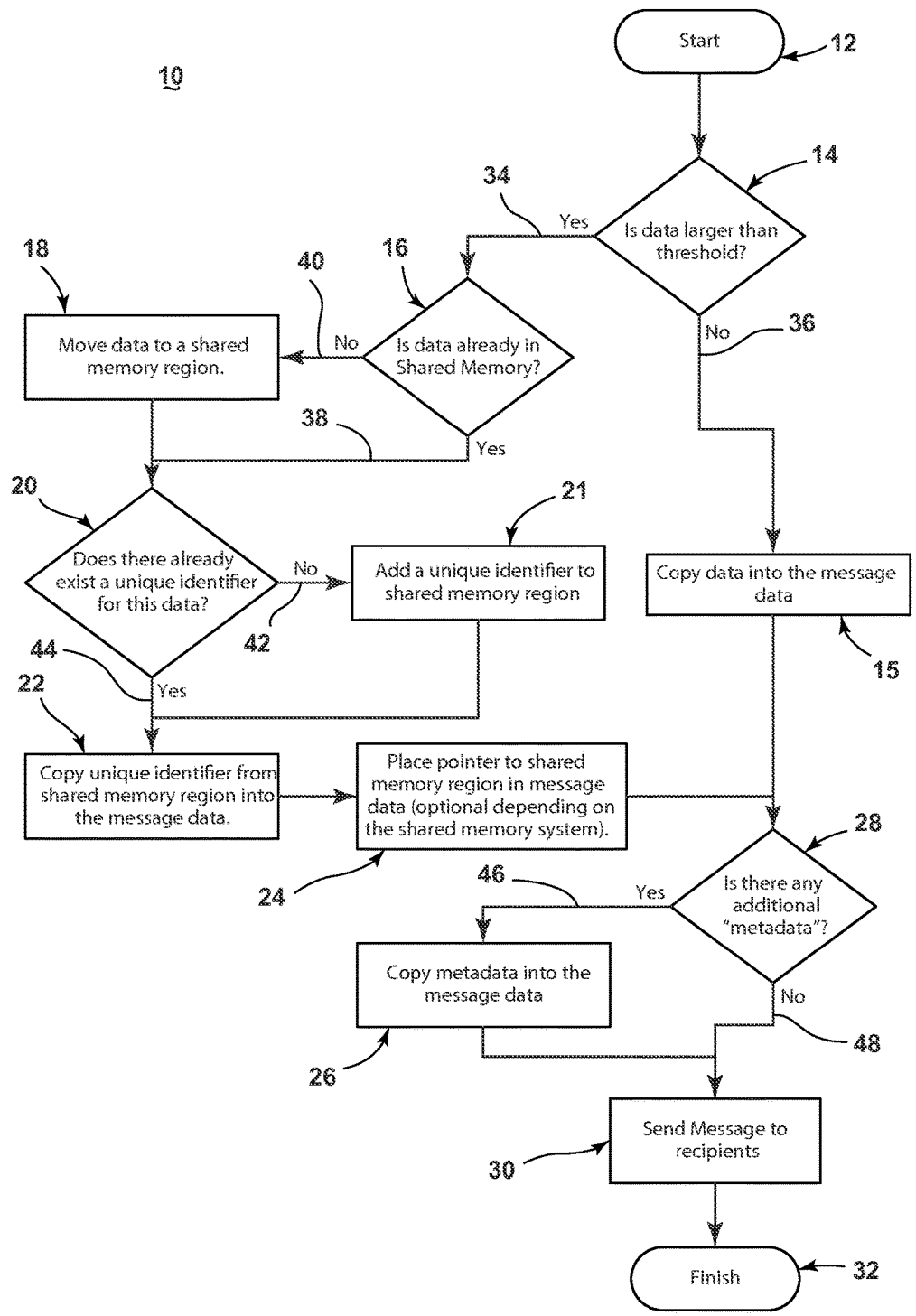

METHOD OF HYBRID MESSAGE PASSING WITH SHARED MEMORY

BACKGROUND OF THE INVENTION

Code performance for applications running in a multiprocessor or multicore processor computing environment may be determined, in part, by how single processing elements in the environment communicate with each other. Shared-memory and message-passing are two broad classes of communication paradigms used for inter-processor communications. Hybrid programming techniques are known that make use of both communication paradigms.

BRIEF DESCRIPTION OF THE INVENTION

One aspect of the invention relates to a method of communicating data between two or more coprocessors in a single computing environment wherein one of the coprocessors is a transmitting processor and another of the coprocessors is a receiving processor. The single computing environment includes a memory accessible by the coprocessors. The method includes determining in the transmitting processor the size of data to be communicated. If the size of the data is below or equal to a predetermined threshold value, then the method attaches the data to a message and transmits the message to the receiving processor. If the size of the data is above the predetermined threshold value, then the method transmits a pointer to the receiving processor, wherein the pointer points to a location of the data in the memory.

BRIEF DESCRIPTION OF THE DRAWINGS

In the drawings:

FIG. 1 is a flowchart showing a method of hybrid message passing with shared memory according to an embodiment of the invention.

DESCRIPTION OF EMBODIMENTS OF THE INVENTION

In the background and the following description, for the purposes of explanation, numerous specific details are set forth in order to provide a thorough understanding of the technology described herein. It will be evident to one skilled in the art, however, that the exemplary embodiments may be practiced without these specific details. In other instances, structures and device are shown in diagram form in order to facilitate description of the exemplary embodiments.

The exemplary embodiments are described with reference to the drawings. These drawings illustrate certain details of specific embodiments that implement a module, method, or computer program product described herein. However, the drawings should not be construed as imposing any limitations that may be present in the drawings. The method and computer program product may be provided on any machine-readable media for accomplishing their operations. The embodiments may be implemented using an existing computer processor, or by a special purpose computer processor incorporated for this or another purpose, or by a hardwired system.

As noted above, embodiments described herein may include a computer program product comprising machine-readable media for carrying or having machine-executable instructions or data structures stored thereon. Such machine-readable media can be any available media, which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium that can be used to carry or store desired program code in the form of machine-executable instructions or data structures and that can be accessed by a general purpose or special purpose computer or other machine with a processor. When information is transferred or provided over a network or another communication connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data, which cause a general purpose computer, special purpose computer, or special purpose processing machines to perform a certain function or group of functions.

Embodiments will be described in the general context of method steps that may be implemented in one embodiment by a program product including machine-executable instructions, such as program code, for example, in the form of program modules executed by machines in networked environments. Generally, program modules include routines, programs, objects, components, data structures, etc. that have the technical effect of performing particular tasks or implement particular abstract data types. Machine-executable instructions, associated data structures, and program modules represent examples of program code for executing steps of the method disclosed herein. The particular sequence of such executable instructions or associated data structures represent examples of corresponding acts for implementing the functions described in such steps.

Embodiments may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the internet and may use a wide variety of different communication protocols. Those skilled in the art will appreciate that such network computing environments will typically encompass many types of computer system configuration, including personal computers, hand-held devices, multiprocessor systems, microprocessor-based or programmable consumer electronics, network PCs, minicomputers, mainframe computers, and the like.

Embodiments may also be practiced in distributed computing environments where tasks are performed by local and remote processing devices that are linked (either by hardwired links, wireless links, or by a combination of hardwired or wireless links) through a communication network. In a distributed computing environment, program modules may be located in both local and remote memory storage devices.

An exemplary system for implementing the overall or portions of the exemplary embodiments might include a general purpose computing device in the form of a computer, including a processing unit, a system memory, and a system bus, that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD-ROM or other optical media. The drives and their associated machine-readable media provide nonvolatile storage of machine-executable instructions, data structures, program modules and other data for the computer.

Technical effects of the method disclosed in the embodiments include improving the performance and scalability of multiprocessor computing systems. Arbitrarily large messages may be transmitted between coprocessors as efficiently as arbitrarily small messages. The additional time necessary to transmit a message from a coprocessor to multiple receiving processors is negligible. The performance of real-time processing systems with large datatypes and a high degree of variation between the size requirements of different messages as with hyperspectral imaging systems may be improved by the method disclosed in the embodiments.

In a single computing environment with at least two coprocessors, it is often necessary, when in the course of processing data input into the computing environment, to communicate data between coprocessors. To pass data between coprocessors, a transmitting processor must send a message to a receiving processor to communicate the data or information about the data to the receiving processor. In a computing environment where message passing is the paradigm of communication, the transmitting processor may send a message with the data contained in the message to one or more receiving processors. Alternatively, in a computing environment with a shared memory system, the transmitting processor may send a message to one or more receiving processors that encodes the location in memory accessible by all coprocessors where the data resides. Then, each coprocessor may directly access the data in shared memory.

FIG. 1 is a flowchart showing a method 10 of communicating data between coprocessors according to an embodiment of the invention that uses a hybrid of message passing with a shared memory. Initially, at step 12, during the course of running an application on a multiprocessor system, it may be necessary for a coprocessor in a computing environment to communicate a particular block of data to at least one other coprocessor. The block of data will have some finite size that can be determined, for example, by the number of bytes necessary in memory to digitally encode the data.

At step 14, the transmitting processor may determine the size of the data to be communicated and compare the size to a predetermined threshold. If, at 36, the size of the data to be communicated is less than or equal to the predetermined threshold, then, at step 15, the transmitting processor may copy the data into a message that will be communicated to one or more receiving processors. Conversely, at 34, if the size of the data to be communicated is larger than the predetermined threshold, then the transmitting processor may determine, at step 16, if the data is located in shared memory.

In one embodiment of the invention, the predetermined threshold may be encoded as a static parameter such as in a configuration file. The configuration file may be an ASCII text file encoded with initial settings as is commonly used for applications, servers and operating systems and often written in a markup language such as XML. Alternatively, the predetermined threshold may be passed to the computing environment as a parameter upon instantiation of an application or even set as an environment variable of the operating system of the computing environment. In all of these examples, a static parameter is encoded that identifies the predetermined threshold to determine whether a particular sized block of data shall be communicated more efficiently by shared memory or message passing.

In another embodiment of the invention, the predetermined threshold may be adaptable. The transmitting processor may insert a timestamp based upon a global clock known to all coprocessors when communicating a message and the receiving processor may then analyze latencies to determine if the predetermined threshold should be modified. Factors that may affect latency and alter the optimal threshold include bus congestion, paging, interrupts, and CPU clock speeds.

At 40, if the transmitting processor determines that the data to be communicated is stored in a memory location that is not accessible by one or more receiving processors then the transmitting processor may move the data to a shared memory region at step 18. The transmitting processor may skip the step of moving the data to a shared memory region if, at 38, the transmitting processor determines that the data to be communicated is already located in a shared memory region.

The transmitting processor may then determine, at step 20, if a unique identifier exists; that is, has been generated and assigned to the data to be communicated to the receiving processors. The unique identifier is a code assigned to a computing object such as a block of data that is meant to enable distributed computing environments to uniquely identify information. In the context of the present invention, the unique identifier is assigned to the data to be communicated such that a receiving processor that accesses the data via shared memory may determine if the data is valid. Invalid data may result from synchronization and expiration issues whereby the shared memory region may be overwritten with new data before a receiving processor accesses the old data corresponding to the unique identifier. The unique identifier may be one of the implementations of universally unique identifiers (UUID) well known in the art of software design. Alternatively, the unique identifier may be a timestamp to encode a time relevant to the data such as when it was written to the shared memory region or, self-referentially, the time at which the unique identifier was created.

At 42, if the transmitting processor determines that a unique identifier does not exist for the data to be communicated that is located in shared memory, then the transmitting processor, at step 21, may generate and prepend a unique identifier to the shared memory region at the location of the data. The transmitting processor may skip the step of adding a unique identifier to the data in a shared memory region if, at 44, the transmitting processor determines that a unique identifier for the data to be communicated already exists and is located in a shared memory region.

Once the transmitting processor determines the unique identifier for the data in shared memory to be communicated, the transmitting processor, at step 22, may copy the unique identifier from the shared memory region to be placed into a message to be sent to the one or more receiving processors. Additionally, at step 24, the transmitting processor may place a pointer into the message, where the pointer is a value indicative of an address in shared memory that locates the data to be communicated. While placing a pointer into the message to be communicated is a preferred embodiment of the invention, a specific computing environment such as the type of shared memory system may obviate directly communicating the pointer from the transmitting processor to the receiving processor. For example, the computing environment may be configured such that the shared memory is partitioned in a way where the location of the data to be communicated may be ascertained by the receiving processor by performing a modulus arithmetic operation on the unique identifier in the message.

The message to be communicated to at least one receiving processor may have a copy of the data in the message as in step 15 or may contain a pointer to a location in shared memory as in step 24. Regardless, the transmitting processor may determine if additional metadata must be transmitted in the message at step 28. If, at 46, the transmitting processor determines to add additional metadata to the message, then the transmitting processor may copy the additional metadata to the message at step 26. The transmitting processor may skip the step of copying additional metadata to the message if, at 48, the transmitting processor determines that no additional metadata is available or necessary for the message.

The metadata may be any set of data that provides additional information to describe the data to be communicated and to enable the most efficient communication of that data. For example, the metadata may contain latency information that characterizes the channel necessary to communicate the data from the transmitting processor to a particular receiving processor. In a computing environment where the data may represent a hyperspectral image that may be formatted in one of several different ways depending upon characteristics such as the number of spectral bands, the bit depth, the image dimensions and the band ordering, the metadata may encode the specific format of the hyperspectral image. Additional information characterizing the optics used to collect the imagery such as f-stop and ISO sensitivity may be encoded as metadata. Also, the processing history including the transforms applied to the hyperspectral image may be stored as metadata.

The transmitting processor may then transmit the message at step 30 to at least one receiving processor. The method is completed at step 32 where each receiving processor may parse the message to either directly determine the data if it is encoded in the message or retrieve the data from the shared memory location if the message contains a unique identifier and pointer.

Many computing environments may benefit from the above described invention. While the transmitting and receiving processing entities are referred to as coprocessors, the invention is equally applicable to processes, kernel threads and fibers. Hardware implementations particularly suited to the invention include graphical processing units (GPU) and multi-core processors due to their highly parallel processing architecture.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of communicating data between coprocessors, comprising:

determining, at a first processor, whether data to be communicated exceeds a an adaptable size threshold, wherein the adaptable size threshold is based at least in part on a network latency;

in response to determining that the data is at least one of less than or equal to the predetermined size threshold, including the data in a message;

in response to determining that the data exceeds the predetermined size threshold, including a unique identifier associated with the data in the message;

determining whether there is metadata associated with the data;

in response to determining that there is metadata associated with the data, including the metadata in the message; and transmitting the message to a second processor.

2. The method of claim 1, further comprising moving the data to a memory location accessible by the first processor and the second processor, in response to determining that the data exceeds the threshold.

3. The method of claim 2, wherein the unique identifier is prepended to the data in the memory location accessible by the first processor and the second processor.

4. The method of claim 1, further comprising including a pointer in the message, in response to determining that the data exceeds the threshold, wherein the pointer includes an address of a memory location accessible by the first processor and the second processor.

5. The method of claim 4, wherein the unique identifier includes a timestamp.

6. The method of claim 1, wherein the network latency is determined from a timestamp included with the data.

7. The method of claim 1, wherein the network latency is based at least in part on a transmit time between the first processor and the second processor.

8. The method of claim 1, wherein the first processor transmits the message to the second processor and a third processor.

9. The method of claim 1, wherein the first processor and the second processor are included in a single computing environment.

10. A method of efficiently communicating data between coprocessors in a single computing environment, comprising:

determining, at a first processor, whether data to be communicated exceeds an adaptable size threshold, wherein the adaptable size threshold is based at least in part on a network latency;

in response to determining that the data is at least one of less than or equal to the adaptable size threshold, including the data in a message;

in response to determining that the data exceeds the adaptable size threshold, determining if the data already exists in a memory location accessible by the first processor and the second processor;

in response to determining that the data does not exist in the memory location accessible by the first processor and the second processor, including a unique identifier associated with the data in the message, and moving the data and the unique identifier to the memory location accessible by the first processor and the second processor;

determining whether there is metadata associated with the data;

in response to determining that there is metadata associated with the data, including the metadata in the message; and transmitting the message to a second processor.

11. The method of claim 10, wherein the network latency is determined from a timestamp included with the data.

12. The method of claim 11, wherein the unique identifier includes the timestamp included with the data.

13. The method of claim 12, wherein the adaptable size threshold value is included in a configuration file.

* * * * *